United States Patent Office 3,421,909
Patented Jan. 14, 1969

1

3,421,909
SILICEOUS COMPOSITIONS CONTAINING AZO AROMATIC COMPOUNDS AS STABILIZERS
Robert L. Rusher, Wilmington, Del., assignor to E. I. du Pont de Nemours and Company, Wilmington, Del., a corporation of Delaware
No Drawing. Continuation-in-part of application Ser. No. 369,589, May 22, 1964. This application Dec. 20, 1967, Ser. No. 691,982
U.S. Cl. 106—14      26 Claims
Int. Cl. B28b 7/36; C04b 35/14

ABSTRACT OF THE DISCLOSURE

The evolution of gas from an aqueous dispersion of granular fused silica and colloidal silica or an aqueous zinc-alkali metal silicate composition can be inhibited by adding to the composition a small amount of an azo aromatic compound.

Cross reference to related applications

This application is a continuation-in-part of my pending application Ser. No. 369,589, filed May 22, 1964, now abandoned.

Brief summary of the invention

This invention relates to siliceous compositions and more particularly is directed to stable aqueous compositions containing granular, fused silica and colloidal silica useful for producing heat resistant coatings on heat sensitive surfaces and also stable zinc-rich paints composed of zinc metal and alkali metal silicates.

The compositions comprise the finely divided granular fused silica suspended in colloidal silica aquasols or the zinc metal-alkali metal silicate mixtures both of which are stabilized against gaseous evolution by the presence of small amounts of azo aromatic compounds. Preferably, the fused silica-colloidal silica compositions of the invention will also contain a suspending agent, such as magnesium montmorillonite clay, to avoid sedimentation of the fused silica.

Detailed description of the invention

The fused silica-colloidal silica compositions of the present invention can be used for coating heat sensitive surfaces and are particularly useful for applying to surfaces which are contacted by molten metals. In general, such surfaces will be those which when contacted by molten metal are subjected to erosion or fracture. Illustrative of such surfaces are the inner walls of molds used in casting metal ingots, in particular ingots of ferrous metals and the metal "stools" on which the molds rest during teeming. Also suitable for coating by these compositions are the surfaces of troughs and chutes used to transport molten metals, the interior surfaces of ladles, conveying receptacles, furnaces, and the like.

It is found that compositions containing finely divided granular fused silica suspended in colloidal silica aquasols exhibit a marked tendency to evolve excessive amounts of gases, particularly when subjected to elevated temperatures. Frequently, this gaseous evolution, which is principally hydrogen, is sufficient to increase pressure in a full container such as a standard 55 gal. drum to as much as 100 p.s.i. or higher which results in container ruptures and presents a serious safety hazard. The mechanism responsible for this evolution of gases is not fully understood but is believed to be caused in some part by the reaction of elemental silicon present in the siliceous composition with alkali present therein from the colloidal silica aquasol component of the composition. It is to be understood that the invention is in no way limited by the latter theory since regardless of what may be the cause of the gaseous evolution, it does commonly occur in siliceous compositions of the type described and presents a serious problem to the art.

It has been found in accordance with the present invention that the above-defined problem of gaseous evolution can be eliminated or greatly minimized by the addition of small amounts of water-soluble azo aromatic compounds which apparently act as stabilizing agents in the composition. The term "azo aromatic compounds" as used herein is intended to embrace cyclic organic compounds broadly which exhibit aromatic character substituted with an azo function. The compounds may be mononuclear or polynuclear and may contain various substituent groups other than the required azo group. The aromatic character of these compounds is due preferably to the presence of the benzene nucleus or nuclei, as the case may be, but may also be due to a carbocyclic nucleus or nuclei other than benzene like indene or to a heterocyclic nucleus or nuclei such as pyridine or thiophene alone or in combination with a benzene nucleus or nuclei which are known to exhibit aromatic character.

Illustrative of such compounds are the following azo dyes listed below with dye name, dye color index (C.I.) number, and structure given for each:

| Dye Name | C.I. No. | Structure |
|---|---|---|
| Acid Orange 8 | 15575 | $NaO_3S\text{-}C_6H_3(CH_3)\text{-}N=N\text{-}C_{10}H_5(OH)$ |
| Acid Orange 7 | 15510 | $NaO_3S\text{-}C_6H_4\text{-}N=N\text{-}C_{10}H_6(OH)$ |
| Acid Yellow 36 | 13065 | $C_6H_5\text{-}N=N\text{-}C_6H_3(SO_3Na)\text{-}NH\text{-}C_6H_5$ |

| Dye Name | C.I. No. | Structure |
|---|---|---|
| Acid Orange 10 | 16230 | *azo dye structure* |
| Acid Yellow 54 | 19010 | *azo dye structure, chromium complex* |
| Direct Red 28 | 22120 | *azo dye structure* |
| Mordant Brown 25 | 13305 | *azo dye structure* |
| Acid Red 74 | 13355 | *azo dye structure* |
| Acid Green 12 | 13425 | *azo dye structure* |
| Food Yellow 7 | 13445 | *azo dye structure* |
| Acid Dye | 13480 | *azo dye structure* |
| Mordant Yellow 57 | 13995 | *azo dye structure* |
| Acid Blue 158 | 14880 | *azo dye structure* |

| Dye Name | C.I. No. | Structure |
|---|---|---|
| Acid Orange 8 | 15575 | |
| Acid Red 141 | 15625 | |
| Acid Dye | 20070 | |
| Acid Black 16 | 20345 | |
| Direct Brown 184 | 21500 | |
| Acid Blue 44 | 21640 | |
| Direct Red 10 | 22145 | |
| Acid Red 97 | 22890 | |
| Direct Red 67 | 23505 | |
| Direct Brown 79 | 30050 | |
| Direct Black 38 | 30235 | |

| Dye Name | C.I. No. | Structure |
|---|---|---|
| Direct Blue 157 | 31680 | (structure shown) |
| Acid Green 33 | 33545 | (structure shown) |

Preferred azo dyes for purposes of the invention are those which exhibit color stability at elevated temperatures, i.e., 300° F. and above due to the additional advantages offered when used in compositions of the invention. Particularly preferred is Acid Orange 8, C.I. No. 15575 from the listing above which by the nomenclature assigned by "Chemical Abstracts" is 4-(2-hydroxy-1-naphthylazo)-m-toluene sulfonic acid.

The use of this compound or other azo dyes of comparable heat stability provides a visual indicator for detecting gaseous evolution. So long as the siliceous composition retains its color typical of the azo dye being used no gas will evolve. A fading of the color will indicate the imminence of gas evolution while a complete lack of color indicates that gas is being evolved. In either of the last two instances, that is, fading color or lack of color in the composition, an operator using the coating composition need only add additional azo dye to be assured that gas evolution will be suppressed.

An additional advantage of employing a color stable azo dye in these compositions is that it provides an expedient and error-proof means for identifying surfaces which have been coated and those which have not. For example, when a coating of the siliceous composition is desired on stool surfaces and mold surfaces for casting steel ingots, the stools and molds which are coated will have a brilliant color. When the hot molten steel is poured into the mold resting on the stool surface, the heat is sufficient to burn out the colored azo dye so that when the mold is removed from the ingot and the ingot removed from the stool their surfaces will be white, the color of the undyed coating composition. Thus, before the molds and stools are reused, the operator is given an immediate indication that the surfaces need to be recoated prior to casting molten steel into the ingots. Moreover, the color of these compositions resulting from the presence of a color stable azo dye also assists the operator to coat or recoat heat sensitive surfaces more efficiently and uniformly since he is visibly able to determine when the total surface has been coated. This is due to the fact that a brightly colored surface will be placed over a white surface instead of a white surface over a white surface which results when an undyed siliceous coating is applied.

The granular fused silica suitable for these compositions has a silica content of not less than 97% silica as $SiO_2$ and a thermal coefficient of expansion not greater than about $6 \times 10^{-7}$ cm./cm./° C. In preferred form the compositions contain fused silicas which have the highest $SiO_2$ content with the lowest coefficient of expansion. Thus, a fused silica having a silica content of 97% and a coefficient of expansion from about $5.5-6 \times 10^{-7}$ cm./cm./° C. is less desirable than a fused silica having a silica content of about 99.8% and a thermal coefficient of expansion no greater than from about $4-5 \times 10^{-7}$ cm./cm./° C. A fused silica of the type useful in the practice of the present invention has the following typical analysis:

| Ingredients— | Percent by weight |
|---|---|
| $SiO_2$ | 97.3 |
| $Al_2O_3$ | 1.7 |
| Suboxides of silica | 0.55 |
| Elemental silicon | 0.45 |
| | 100.00 |

A material of this type has a thermal coefficient of expansion of about $5 \times 10^{-7}$ cm./cm./° C. Silica products of this type are readily prepared by hammer-milling and grinding very pure fused silica glasses which are formed by reduction of relatively pure silica sands by graphite electrodes in an electric arc furnace.

Silica aquasols suitable for use in these compositions are described in Bechtold and Snyder, U.S. Patent No. 2,574,902, Rule U.S. Patent No. 2,577,485, and White U.S. Patent No. 2,285,477; Alexander U.S. Patent No. 2,750,345, Marshall U.S. Patent No. 2,515,960, Trail U.S. Patent No. 2,573,743, Atkins U.S. Patent No. 3,012,973, and Legal U.S. Patent No. 2,724,701.

Such silica aquasols contain silica particles which are spherical and which have an average size from about 3 to 150 millimicrons. Preferably the particle size is from about 5 to 50 millimicrons. The ratio $SiO_2:Na_2O$ can range from about 60:1 up to the upper limits of the above cited patents. In general, these sols will be basic in nature.

It is highly preferable, although not essential, to incorporate a suspending agent in these compositions to avoid the settling out of the fused silica particles. Very suitable suspending agents are the magnesium montmorillonite clays which are readily available commercially. Particularly preferred are the magnesium-aluminum-silicates having a lath-like structure which are commonly known as hectorite-type clays such as the products "Ben-A-Gel" and "Ben-A-Gel," EW available from National Lead Company. These clays appear in electromicrographs to have an ultimate particle which is about one micron long, 100 to 200 millimicrons wide and one to 10 millimicrons thick. Because the lath-like ultimate particles of such clays occur in bundles, dispersal in water with ordinary mixing produces little viscosity increase even after prolonged contact with the water and frequently sedimentation occurs on standing. To be most useful in the compositions for reasons explained hereafter, high shear mixing is employed such as obtainable with a colloid mill. In this manner the aqueous siliceous compositions obtained are viscous and nonsettling.

Because of the presence of the magnesium montmorillonite clay, the siliceous solids suspended within the aqueous dispersion remain in suspension for extended periods of time. Thus, the compositions provide for the first time, a fused silica-colloidal silica aqueous composition which can be pre-mixed well in advance of the time for its intended use. In addition, the coatings resulting from spraying or brushing these compositions on heat sensitive surfaces obtain uniform thickness throughout whether the surface being coated is vertically or horizontally disposed. The presence of the magnesium montmorillonite clay prevents the tendency for the siliceous solids to concentrate at the lower level of vertical or inclined surfaces. Another advantage resulting from the presence of the montmorillonite clay in the compositions is that the solids in suspension do not clog the applying equipment as for example, piping, spray nozzles, elbows, tees, rubber lines, etc. of pressurized spraying equipment used to apply the composition to surfaces.

The proportions of fused silica and colloidal silica in the coating compositions expressed on a solids weight basis can vary from 10:0.5 to 10:60. Compositions in which the ratio of fused silica to colloidal silica solids is about 10:3 are most preferred. The magnesium montmorillonite clay, when used, is added in amounts ranging from 0.05 to 2% by weight based on the aqueous fused silica-colloidal silica suspension. The aqueous siliceous coating composition can have a total solids content ranging from about 30% to 80% by weight solids, with a total solids of about 65% being most preferred.

The amount of the azo aromatic compound required to provide effective stabilization of these compositions is usually quite small and will vary to some extent with the particular compound employed. In general, an amount ranging between about 0.01% to 1% by weight based on the fused silica-colloidal silica aqueous suspension will be desired, although some stabilization occurs when lower concentrations are used. Amounts above 1% by weight can be used but usually are not justified economically. It is only necessary in using amounts in excess of 1% by weight to insure that the azo compound does not have a tendency to gel the silica sol components of the composition. In most instances the preferred amount will range between 0.1% and 0.6% by weight. The term "water soluble" used in connection with azo aromatic compounds herein is intended to mean azo compounds which are sufficiently water soluble to be dissolved in the fused silica-colloidal silica aqueous suspension in an amount to provide some effective stabilization against gaseous evolution which in view of the above discussion means compounds having a water-solubility in the compositions of at least about 0.01% by weight.

In formulating these compositions, the fused silica can be added to the colloidal silica aquasol which contains the water-soluble azo aromatic compound and to which has previously been added with high shear mixing the magnesium montmorillonite clay. Alternatively, the fused silica and montmorillonite clay can be premixed in a dry state and then added to the azo compound containing colloidal silica aquasol with high shear mixing. Also each of the ingredients of the composition can be first suspended in aqueous medium and then the resulting aquasols can be mixed together in the proper proportions with agitation.

These compositions are most advantageously applied by spraying them upon the surfaces to be coated with conventional spraying equipment. Alternatively, the composition can be applied by brushing, flow coating, dipping, or any other suitable means. It is preferred that the compositions are sprayed upon surfaces which are at elevated temperatures to aid in driving off the aqueous carrier leaving behind the granular fused silica bound together by colloidal silica particles.

The nascent hydrogen scavenger dyes of the invention can also be used to overcome the inherent problem of pinholing and blistering found in zinc-rich paints which results from the evolution of hydrogen gas resulting from the reaction of finely divided zinc metal with alkali metal silicates.

Zinc-rich paints are coatings prepared from finely divided metallic zinc and an alkali metal silicate. These coatings are used extensively for the protection of iron and steel from corrosion. To use these coatings, zinc dust and silicate are stored and shipped separately due to the reaction of the zinc dust with the alkali silicates. Just before using, the two are mixed and applied to a sandblasted metal surface. The zinc dust serves as a sacrificial anode being consumed rather than the base metal.

Such coatings are described in detail in U.S. Patent 3,130,061. This patent also describes the problem of hydrogen gas evolution with the paint compositions.

The dyes of this invention have been found to eliminate the problem of hydrogen evolution and as a result give coating surfaces with no pinholing, no blistering and improved hardness. Zinc dusts suitable for use in this invention are those commercially available dusts which are predominately less than 15 microns in average particle size and preferably those of 2½ to 5 microns average particle size.

Zinc dust should be used in amounts such that from 85 to 96% of the dry film formed is zinc after the aqueous coating composition dries. Lower amounts of zinc can be used but performance suffers. In the case of other metal coatings such as aluminum, amounts as low as 60% can be used.

In preparing the paint, zinc dust is admixed with the alkali silicate vehicle to give from about 0.9 to about 5 parts of zinc per part of weight of silicate vehicle. Although larger amounts of zinc can be used with some silicate vehicles, practicality requires that zinc not exceed an amount which will give a paintable composition.

Zinc dust is the preferred metal. However, other metal pigments such as aluminum flake or finely divided lead can also be used in these compositions.

The finely divided inorganic additives traditionally used in paint compositions can also be added with the zinc powder as desired. For example, pigments, extenders and further anti-corrosion agents can be added for such advantages as they impart.

The silicate can be any alkali metal silicate, such as sodium, potassium or lithium silicates. Combinations of these can also be used since it is quite popular to use a mixture of sodium and lithium silicates as the vehicle.

The concentration of the dye can be from 0.05 to 1% or even 3% based on the weight of aqueous silicate binder solution. The high cost of the dye will prevent one from using the higher concentration in practical operation. The preferred concentration is approximately 0.5% weight of the dye based on the weight of the alkali silicate solution used as the binder.

A better understanding of the invention will be gained from the following working examples:

EXAMPLE 1

A 300 gallon mixing kettle is charged with 550 lbs. of colloidal silica aquasol containing 30% by weight silica solids and having a a $SiO_2/Na_2O$ ratio of 96:1 ("Ludox" HS Colloidal Silica marketed by E. I. du Pont de Nemours & Co.). Four lbs. of Acid Orange 8, C.I. 15575 (4-(2-hydroxy-1-naphthylazo)-m-toluene sulfonic acid), are added to the colloidal silica aquasol with gentle agitation.

With vigorous agitation, 8 lbs. of magnesium montmorillonite clay ("Ben-A-Gel," EW marketed by National Lead Company) are sifted into the silica sol-azo dye mixture and agitation is continued until the clay is homogenously dispersed in the sol.

The resulting slurry is then recirculated for one hour through a three stage centrifugal pump, driven at 3450 r.p.m., to shear the clay. As the clay slurry thickens due to the shear mixing, an additional 550 lbs. of the colloidal silica sol are added to keep the slurry fluid. When no further thickening due to shear mixing is observed, a final amount of 900 lbs. of the colloidal silica sol is added with continued mixing to bring the total silica sol content added to 2000 lbs., thus producing a highly sheared dispersion of 0.4% by weight magnesium montmorillonite clay in the silica sol-azo dye mixture.

To this dispersion is then added slowly, with continued agitation, 2000 lbs. of a fused silica powder of the following analysis

| | |
|---|---|
| $SiO_2$ percent by weight | 97.3 |
| $Al_2O_3$ do | 1.7 |
| Suboxides of silica do | 0.55 |
| Elemental silicon do | 0.45 |
| Thermal coefficient of expansion cm./cm./° C | $5 \times 10^{-7}$ | and having the following particle size distribution:

| Percent of particles by weight— | Size microns |
|---|---|
| 1 | >150 |
| 12 | 75–150 |
| 30 | 45–75 |
| 57 | <45 |

The resulting silicious composition has a pH of 9.6 and contains 65% by weight solids. It is ready for use as a coating on heat sensitive surfaces by spraying, dipping, or brushing it thereon. The solids contained in the silicious composition remain homogenously dispersed under both static and vibration storage. It is sufficiently fluid to be pumped through conventional metal and rubber piping without any clogging tendencies.

Under confined storage for a period of one month, the silicious composition is found to be free of any gaseous evolution and free from any build-up of pressure within its containers.

Coating of this composition on the inner surfaces of steel casting molds and upper surfaces of casting stools prior to metal pouring prevents welding of the cast ingots to the molds and stools and prevents mold and stool erosion. Thus, mold and stool life are substantially prolonged and ingots are readily removed from their molds.

EXAMPLE 2

The composition of Example 1 is prepared as described therein, except that 0.5% "Ben-A-Gel" EW, montmorillonite clay is used instead of 0.2%, 20 lbs. of metanil yellow azo dye is added instead of the four lbs. of "Orange RO" azo dye, and the additions are made without shear mixing.

The resulting composition has substantially the same properties and use characteristics as described for that of Example 1.

EXAMPLE 3

A 300 gallon mixing kettle is charged with 550 lbs. of colloidal silica aquasol containing 30% by weight silica solids and having a $SiO_2/Na_2O$ ratio of 285 ("Ludox" LS Colloidal Silica marketed by E. I. du Pont de Nemours & Co.). Four lbs. of Acid Orange 7, C.I. 15510, [p-(2-hydroxy-1-naphthylazo)benzene sulfonic acid] are added to the colloidal silica aquasol with gentle agitation.

With vigorous agitation, 8 lbs. of magnesium montmorillonite clay ("Ben-A-Gel" EW, marketed by National Lead Company) are sifted into the silica sol-azo dye mixture and agitation is continued until the clay is homogenously dispersed in the sol.

The resulting slurry is then recirculated for one hour through a three stage centrifugal pump, driven at 3450 r.p.m., to shear the clay. As the clay slurry thickens due to the shear mixing, an additional 550 lbs. of the colloidal silica sol are added to keep the slurry fluid. When no further thickening due to shear mixing is observed, a final amount of 900 lbs. of the colloidal silica sol is added with continued mixing to bring the total silica sol content added to 2000 lbs., thus producing a highly sheared dispersion of 0.4% by weight magnesium montmorillonite clay in the silica sol-azo dye mixture.

To this dispersion is then added slowly, with continued agitation, 2000 lbs. of a fused silica powder of the following analysis:

| | |
|---|---|
| $SiO_2$ percent by weight | 97.3 |
| $Al_2O_3$ do | 1.7 |
| Suboxides of silica do | 0.55 |
| Elemental silicon do | 0.45 |
| Thermal coefficient of expansion cm./cm./° C | $5 \times 10^{-7}$ |

The resulting silicious composition has a pH of 9.6 and contains 65% by weight solids. It is ready for use as a coating on heat sensitive surfaces by spraying, dipping, or brushing it thereon. The solids contained in the silicious composition remain homogenously dispersed under both static and vibration storage. It is sufficiently fluid to be pumped through conventional metal and rubber piping without any clogging tendencies.

Under confined storage for a period of one month, the silicious composition is found to be free of any gaseous evolution and free from any build-up of pressure within its containers.

Coatings of this composition on the inner surfaces of steel casting molds and upper surfaces of casting stools prior to metal pouring prevents welding of the cast ingots to the molds and stools and prevents mold and stool erosion. Thus, mold and stool life are substantially prolonged and ingots are readily removed from their molds.

EXAMPLES 4–10

Example 3 above is repeated using in place of Acid Orange 7, C.I. 15510, the following azo aromatic compounds:

| Run No. | Azo stabilizing compound |
|---|---|
| 4 | Acid Yellow 36, C.I. 13065 [m-(p-anilinophenylazo) benzene sulfonic acid]. |
| 5 | Acid Orange 10, C.I. 16230 [1-phenylazo-2-naphthol-6,8-disulfonic acid]. |
| 6 | Direct Red 28, C.I. 22120. |
| 7 | Acid Yellow 54, C.I. 19010. |
| 8 | Acid Red 74, C.I. 13355. |
| 9 | Acid Green 12, C.I. 13425. |
| 10 | Acid Blue 158, C.I. 14880. | in similar amounts whereby siliceous compositions are obtained having similar properties and use characteristics to that described for the compositon of Example 3.

EXAMPLE 11

An azo dye is introduced into a lithium silicate solution at a concentration of 0.5% by weight. The dye is Metanil yellow, which is chemically m-(p-anilinophenylazo)benzene sulfonic acid.

The lithium silicate has a $SiO_2$ to $Li_2O$ ratio of 4.8 and a total solids concentration of 20%.

The lithium silicate is then formulated into a zinc-rich paint vehicle by the addition of 0.1% Carbopol 941, as a thickener and 0.05% $K_2Cr_2O_7$ as a corrosion inhibitor. This vehicle is then mixed with zinc to obtain 93% zinc in the dry film.

The paint is sprayed on sand blasted mild steel panels and dried for 1, 2, 4 and 24 hours. For comparison purposes similar paint is prepared with the exception that no dye is added and these are also applied in a similar manner to metal panels. Panels are then immersed in tap water for one hour after the drying times indicated above, and then redried two hours and abraded for 100 cycles with a Taber abrader. Vehicles containing the azo dye have a marked increase in the resistance of the coating to wet abrasion.

In addition these same panels while immersed in tap water show no hydrogen bubbles evolving from the coating, making the coating less porous and less susceptible to leaching of the binder. All of the panels sprayed without the dye show hydrogen evolution, some pinholing and blisters in the dried film. The dye also seems to markedly decrease the reaction of the zinc with the silicate and as a result the pot life or the time required for the zinc dust-lithium silicate mixture to increase in viscosity in which it can no longer be sprayed seemed to be considerably improved.

I claim:

1. In siliceous compositions selected from the group consisting of a composition useful for coating heat-sensitive surfaces comprising an aqueous dispersion of granular fused silica and colloidal silica and an aqueous zinc-alkali metal silicate composition useful for inhibiting corrosion of metal surfaces, the improvement comprising a water-soluble azo aromatic compound present in an amount sufficient to inhibit evolution of gas from said composition.

2. In a siliceous composition useful for coating heat-sensitive surfaces comprising an aqueous dispersion of granular fused silica and colloidal silica, the improvement comprising a water-soluble azo aromatic compound present in an amount sufficient to inhibit evolution of gas from said composition.

3. The composition of claim 2 wherein said amount of said azo aromatic compound is from 0.01% to 1% by weight based on the weight of said dispersion.

4. The composition of claim 2 wherein said amount of said azo aromatic compound is from 0.1% to 0.6% by weight based on the weight of said dispersion.

5. The composition of claim 2 wherein the ratio of said fused silica to said colloidal silica in said aqueous dispersion is from 10:0.5 to 10:60 on a solids by weight basis.

6. The composition of claim 2 wherein the total solids content ranges from 30% to 80% by weight.

7. The composition of claim 2 wherein the azo compound is 4-(2-hydroxy-1-naphthylazo)-m-toluene sulfonic acid.

8. The composition of claim 2 wherein the azo compound is p-(2-hydroxy-1-naphthylazo)benzene sulfonic acid.

9. The composition of claim 2 wherein the azo compound is m-(p-anilinophenylazo)benzene sulfonic acid.

10. The composition of claim 2 wherein the azo compound is 1-phenylazo-2-naphthol-6,8-disulfonic acid.

11. In a siliceous composition useful for coating heat-sensitive surfaces comprising an aqueous dispersion of granular fused silica and colloidal silica and from 0.05% to 2.0% by weight, based on the weight of said dispersion, of a magnesium montmorillonite clay, the improvement comprising a water-soluble azo aromatic compound present in an amount sufficient to inhibit evolution of gas from said composition.

12. The composition of claim 11 wherein said amount of said azo aromatic compound is from 0.01% to 1% by weight based on the weight of said dispersion.

13. The composition of claim 12 wherein the ratio of said fused silica to said colloidal silica in said aqueous dispersion is about 10:3 on a solids by weight basis.

14. The composition of claim 12 wherein the total solids content is about 65% by weight.

15. The composition of claim 12 in which the azo compound is 4-(2-hydroxy-1-naphthylazo)-m-toluene sulfonic acid.

16. The composition of claim 12 in which the azo compound is m-(p-anilinophenylazo)benzene sulfonic acid.

17. The composition of claim 12 in which the azo aromatic compound is 1-phenylazo-2-naphthol-6,8-disulfonic acid.

18. The composition of claim 12 in which the azo aromatic compound is 4-(2-hydroxy-1-naphthylazo)-m-toluene sulfonic acid.

19. The composition of claim 11 wherein said amount of said azo aromatic compound is from 0.1% to 0.6% by weight based on the weight of said dispersion.

20. The composition of claim 19 wherein said azo aromatic compound is 4-(2-hydroxy-1-naphthylazo)-m-toluene sulfonic acid.

21. In a siliceous composition useful for inhibiting corrosion of metal surfaces comprising an aqueous zinc metal-alkali metal silicate composition, the improvement comprising a water-soluble azo aromatic compound present in an amount sufficient to inhibit evolution of gas from said composition.

22. The composition of claim 21 wherein the alkali metal silicate is lithium silicate.

23. The composition of claim 21 wherein said amount of azo compound is from 0.05% to 1% by weight based on the weight of aqueous alkali metal silicate solution.

24. The composition of claim 2 wherein said amount of said azo aromatic compound is from 0.01% to 1% by weight based on the weight of said dispersion, the ratio of said fused silica to said colloidal silica in said aqueous dispersion is from 10:0.5 to 10:60 on a solids by weight basis and the total solids content is from 30% to 80% by weight.

25. The composition of claim 21 wherein said zinc metal comprises from 85% to 96% by weight of said composition exclusive of water.

26. The composition of claim 25 wherein said alkali metal silicate is lithium silicate.

References Cited
UNITED STATES PATENTS

| | | | |
|---|---|---|---|
| 2,193,557 | 3/1940 | Everest | 8—82 |
| 2,526,938 | 10/1950 | Davis | 252—408 |
| 3,231,537 | 1/1966 | Fisher | 106—14 |

JULIUS FROME, *Primary Examiner.*

THEODORE MORRIS, *Assistant Examiner.*

U.S. Cl. X.R.

106—38.2, 38.3, 84, 287; 117—5.3